Oct. 5, 1965    H. STERN    3,210,634
BICYCLE OPERATED GENERATOR
Filed Nov. 24, 1961
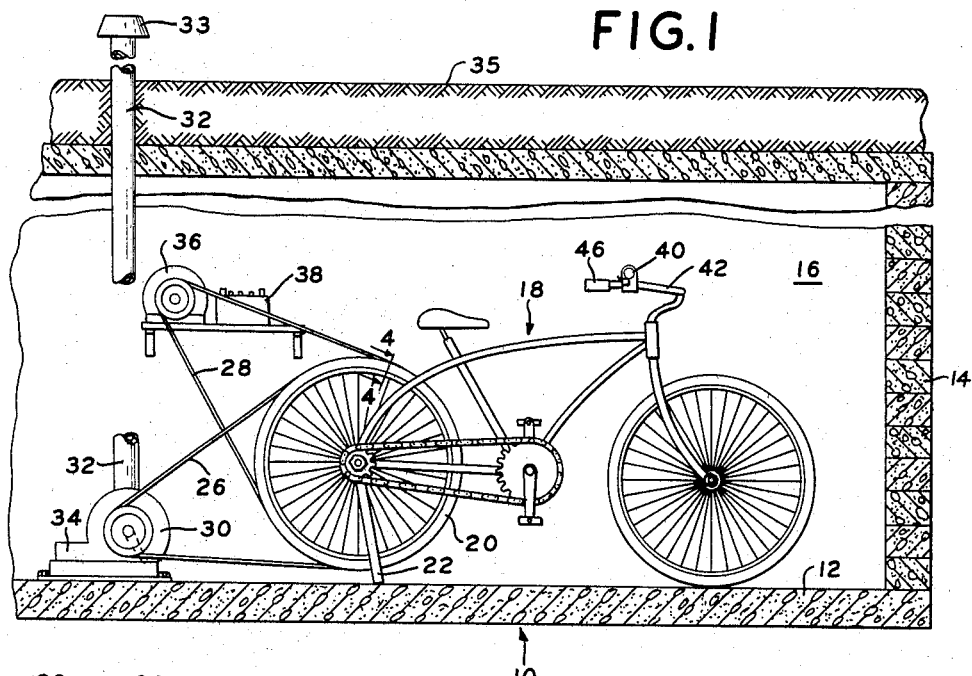
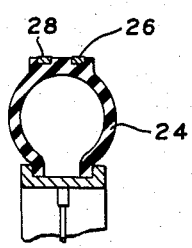
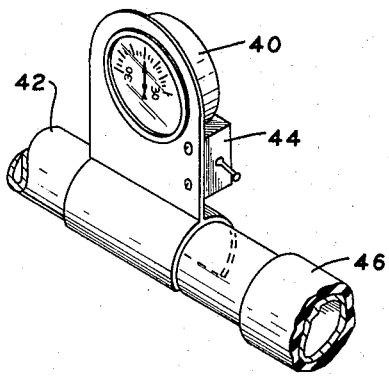
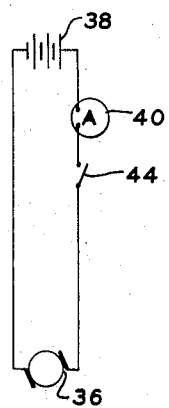
INVENTOR.
HARRY STERN
BY Arthur H. Seidel
ATTORNEY

United States Patent Office 3,210,634
Patented Oct. 5, 1965

3,210,634
BICYCLE OPERATED GENERATOR
Harry Stern, New York, N.Y., assignor to
Morton M. Rosenfeld, New York, N.Y.
Filed Nov. 24, 1961, Ser. No. 154,516
3 Claims. (Cl. 320—61)

This invention relates to a bicycle operated generator, more particularly, to an ammeter and switch mounted so that the operator of the bicycle may visually ascertain whether the battery is being charged as a result of the operator's efforts. A toggle switch is mounted on the ammeter to break the circuits and thereby prevent a backflow of current from the battery to the ammeter thereby discharging the battery.

The present invention is particularly adapted for use in underground enclosures such as bombshelters and the like. The present invention is disclosed hereinafter as being disposed within a bombshelter in a manner so that the pumping efforts of the operator of the bicycle may be utilized to operate the blower of the bombshelter ventilation system and/or operate a generator to generate electricity. The electricity so generated will be stored in a battery and may be used to operate radios and the like. While a generator will be discussed hereinafter, it will be appreciated that an alternator may be utilized in place of a generator.

There is an object of the present invention to provide a novel bicycle operated generator having a current measuring meter in a circuit with said generator.

It is another object of the present invention to provide a bicycle operated generator in a circuit with a current measuring meter disposed on the bicycle so that the operator of the bicycle may readily ascertain the approximate amount of current resulting from his efforts.

It is another object of the present invention to provide a switch operated ammeter on a bicycle adapted to operate a generator, said ammeter being positioned so that it may be switched on and off by the bicycle operator without the operator removing his hands from the bicycle handlebars.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a partial, sectional view of a bombshelter having a bicycle operated generator in accordance with the present invention disposed therein.

FIGURE 2 is a partial perspective view of a portion of the handlebar of the bicycle illustrated in FIGURE 1.

FIGURE 3 is a schematic circuit diagram.

FIGURE 4 is a transfer sectional view of the peripheral portion of the rear tire of the bicycle illustrated in FIGURE 1.

Referring to the drawing in detail, wherein like numerals indicate like elements, there is shown in FIGURE 1 a portion of a bombshelter designated generally as 10. The bombshelter 10 may be disposed above ground, underground, or in the basement of a building.

The bombshelter 10 includes a floor 12 having sidewalls 14 and 16 extending upwardly therefrom. A bicycle designated generally as 18 is disposed on the floor 12 in a normal operating position. The rear wheel 20 of the bicycle 18 is raised above the floor 12 by means of the kickstand 22.

As shown more clearly in FIGURE 4, the tire 24 on the rear wheel 20 is provided with a pair of spaced parallel grooves extending around the periphery of the tread portion in a circumferential path with respect to the axis of rotation of the rear wheel 20. The grooves each receive one of the belts 26 and 28. The rear wheel 20 is provided with a sprocket interconnected with a pedal operated sprocket by means of a chain in a conventional manner. Hence, rotation of the pedals causes rotation of the sprockets and the rear wheel.

The belt 26 extends around the rear wheel 20 and a pulley on a blower 30. The blower 30 is a part of the ventilation system for the bombshelter 10. The input side of the blower 30 is connected to atmosphere by means of a vent pipe 32. The blower 30 is provided with an output lead pipe 34 which is communication with the interior of the bombshelter 10. Hence, a rotation of the rear wheel 20 operates the blower 30 to cause forced circulation of air between the atmosphere and the interior of the bombshelter 10. The end of the pipe 32 remote from the blower 30 is preferably extended to a point above ground level 35 and provided with an inverted hood 33.

The belt 28 extends around the rear wheel 20 and a pulley secured to the armature of a rotary generator 36. The brushes on the generator 36 are connected by wires to a battery 38. The generator 36 and battery 38 may be conveniently supported above the blower 30 by a shelf or the like.

As shown more clearly in FIGURE 3, the ammeter 40 and switch 44 are disposed in series and coupled between the battery 38 and generator 36. When insufficient current is being generated, the operator may readily ascertain the same so that he may increase his pumping efforts. As long as the switch 44 is open, current cannot flow through the circuit thereby discharging the battery 38. While the battery 38 is illustrated in the drawing as a discrete element, it will be appreciated that the battery 38 may be an integral part of a battery operated device such as a radio or the like. In lieu of an ammeter, a pilot light which flashes red or green may be substituted therefor. However, the pilot light suffers from the disadvantage that it does not provide any indication as to the extent or amount of current being generated. Thus, a pilot light merely indicates whether more than or less than a predetermined amount of current is being generated.

The belts 26 and 28 are readily disconnectible with respect to the blower 30 and generator 36. When the ammeter 40 indicates that sufficient energy has been generated, the belt 28 may then be disconnected. Thereafter, only sufficient rotary energy need be generated to operate the blower 30. This decrease in the amount of rotary energy needed is accomplished by the bicycle operator decreasing his pumping efforts. Hence, the ammeter 40 will tell the operator when he may decrease his pumping speed.

The present invention may be embodied in other specific forms without departing from the spirit or essential attributes thereof and, accordingly, reference should be made to the appended claims, rather than to the foregoing specification as indicating the scope of the invention.

I claim:
1. Apparatus comprising a supporting surface, a bicycle on said surface, means raising a rear wheel of said bicycle above said surface so that said rear wheel may rotate without contacting said surface, means separate and apart from said bicycle supporting a generator, said rear wheel having a first groove about the periphery thereof, said generator having a pulley mounted on the shaft thereof, a belt interconnecting said rear wheel and said generator pulley and fitting within a portion of said rear wheel peripheral grooves, the diameter of said rear wheel being several times larger than the diameter of said generator pulley.

2. The apparatus of claim 1 including a blower, said blower being mounted on said supporting surface spaced from said bicycle, said blower having a pulley, said rear wheel having a second peripheral groove therein parallel to said first peripheral groove, and a second belt interconnecting said blower pulley and said rear wheel and fitting within a portion of said second rear wheel peripheral groove.

3. The apparatus of claim 1 including an ammeter on said bicycle, a battery, said ammeter being electrically coupled to said generator and said battery, a switch mounted on a handle bar of said bicycle, said switch being coupled to the circuit between said generator and said ammeter, said switch and ammeter being mounted on said handle bar in a position so that said switch may be manipulated without requiring the operator of the bicycle to remove his grasp with respect to the handle bar.

References Cited by the Examiner

UNITED STATES PATENTS

| | | | |
|---|---|---|---|
| 568,209 | 9/96 | Rodriguez | 322—42 X |
| 778,133 | 12/04 | Keates | 322—42 X |
| 2,488,021 | 11/49 | May | 310—75.3 |

FOREIGN PATENTS

| | | |
|---|---|---|
| 9,662 | 1893 | Great Britain. |
| 3,051 | 1899 | Great Britain. |

LLOYD McCOLLUM, *Primary Examiner.*